United States Patent [19]

Boop

[11] Patent Number: 5,425,062
[45] Date of Patent: Jun. 13, 1995

[54] SERIAL RATE CONVERSION CIRCUIT WITH JITTER TOLERANT PAYLOAD

[75] Inventor: Gregory W. Boop, Cary, N.C.

[73] Assignee: Alcatel Network Systems, Inc., Richardson, Tex.

[21] Appl. No.: 962,319

[22] Filed: Oct. 16, 1992

[51] Int. Cl.$^6$ .................... H04L 23/00; H04L 7/00
[52] U.S. Cl. ........................... 375/377; 375/371
[58] Field of Search .............. 375/121, 118, 112; 370/84, 105.3, 100.1, 102

[56] References Cited

U.S. PATENT DOCUMENTS 4,229,815 10/1980 Cummiskey ..................... 370/84

OTHER PUBLICATIONS

"Technical Terms" Second edition, Daniel N. Lapedes, McGraw-Hill, 1978.

*Primary Examiner*—Stephen Chin
*Assistant Examiner*—Tesfaldet Bocure
*Attorney, Agent, or Firm*—Baker & Botts

[57] ABSTRACT

A serial rate conversion circuit converts the serial rate of a stream of signals, for example, from a SONET overhead data link (ODL) rate of 6.48 Mb/s to and from a data communications channel (DCC) rate of 4.096 Mb/s. The circuit includes a low data flow memory and address select circuit for communicating the stream of serial formatted signals at a low data flowrate and a high data flow memory and address select circuit for communicating the stream of serial formatted signals at a high data flowrate. Clock rate conversion circuitry associates between the low data flow memory and address circuit and the high data flow memory and address select circuit to convert the high data flow serial formatted signals back and forth between the low data flowrate and the high data flowrate while maintaining said stream in a serial format. To provide jitter tolerance during the serial rate conversion process, the high data flowrate frame associates with the low data flowrate frame so that the low data flowrate frame elements are cushioned or buffered by leading and following high data flowrate frame elements.

3 Claims, 3 Drawing Sheets

| BYTE 1 | BYTE 2 | BYTE 3 | BYTE 4 | BYTE 5 | BYTE 6 | BYTE 7 | ... | ... |
|--------|--------|--------|--------|--------|--------|--------|-----|-----|
|        |        |        |        |        |        |        |     |     |
|        |        |        |        |        |        |        |     |     |
|        |        |        |        |        |        |        |     |     |
|        |        |        |        |        |        |        |     |     |
|        |        |        |        |        |        |        |     |     |
|        |        |        |        |        |        |        |     |     |
|        |        |        |        |        |        |        |     |     |
|        |        |        |        |        |        |        |     |     |
| ...    | ...    | BYTE 93 | BYTE 94 | BYTE 95 | BYTE 96 | BYTE 97 | BYTE 98 | BYTE 99 |
| *      | *      | *      |        |        |        |        |     |     |

FIG. 5

| XXX | XXX | XXX | XXX | XXX | XXX | XXX | XXX | XXX |
|-----|-----|-----|-----|-----|-----|-----|-----|-----|
| XXX | XXX | XXX | XXX | XXX | XXX | XXX | XXX | XXX |
| DCC 2 | DCC 3 | DCC 4 | DCC 5 | DCC 6 | DCC 7 | ... | ... | ... |
|     |     |     |     |     |     |     |     |     |
|     |     |     |     |     |     |     |     |     |
|     |     |     |     |     |     |     |     |     |
|     |     |     |     |     |     |     |     |     |
|     |     |     |     |     |     |     |     |     |
| ... | ... | ... | DCC 59 | DCC 60 | DCC 61 | DCC 62 | DCC 63 | DCC 64 |
| XXX | XXX | XXX | XXX | XXX | XXX | XXX | XXX | XXX |
| XXX | XXX | XXX | XXX | XXX | XXX | XXX | XXX | XXX |
| *   | *   | *   |     |     |     |     |     |     |

FIG. 6

SERIAL RATE CONVERSION CIRCUIT WITH JITTER TOLERANT PAYLOAD

TECHNICAL FIELD OF THE INVENTION

The present invention is generally directed to electronics and more specifically to serial data flowrate conversion circuits. Even more specifically, the present invention is directed to an approach for converting the rate of serial link data back and forth between a high-rate that uses a high-rate data frame and low-rate that uses a low-rate data frame in a way that does not transform the data into a parallel format and that centers the low-rate data frame as a payload within the high-rate data frame to provide jitter tolerance.

BACKGROUND OF THE INVENTION

1. Field of the Invention

The synchronous optical network (SONET) is a new ANSI standard for advanced fiber optic transmission. SONET defines a standard optical interface that allows mid-span meets between equipment produced by different manufacturers. Therefore, the rate conversion of SONET clock rate-derived data to a clock rate suitable for data communication integrated circuits is and for some time to come will be a common operation in telecommunication systems. To accomplish this, it is necessary to rate convert serial streams containing multiple 8-bit time slots from one clock rate to another in dual directions with a minimal amount of circuitry. A principal focus of such an approach would be to provide an implementation that is tolerate of long- or short-term variation in the clock signals. An example is the ability to convert numerous data communication channels that are embedded in a SONET overhead data link (ODL) from a higher data flowrate of 6.48 Mb/s to a lower data communications channel (DCC) integrated circuit data flowrate of 4.096 Mb/s with tolerance for jitter that may arise from the conversion process.

2. Description of Related Art

Many serial rate conversion circuits use dual port RAMs or FIFOs. These circuits convert the data from serial to parallel and back to serial in the rate conversion process. The payload traffic in these solutions is usually not tolerate of jitter or wander in the clock signals. Consequently, traffic often will be lost if any short- or long-term variation arises from the rate conversion.

Conventional approaches that convert the serial data to parallel store the data as 8-bit parallel data in a first set of RAMs and RAM buffers. Then, the 8-bit parallel data is read into a different set of RAMs and RAM buffers to be read out serially. The 8-bit parallel data is converted to a serial format having the desired rate. A significant problem with the conventional way of converting from one serial data flowrate to another is the significant amount of circuitry necessary to convert the serial data to parallel data and the resulting parallel data into serial data. This requires external RAM and the use of at least two field programmable gate arrays.

SUMMARY OF THE INVENTION

The present approach overcomes these limitations by providing rate conversion of serial link data without transforming the data into parallel and by centering the payload of the low-speed interface within the high-speed frame for providing jitter tolerance. Using the present approach, a significant reduction (between 20 and 40%) in component count and board space results for an equivalent number of serial links as compared to conventional parallel solutions using dual port RAMs and FIFOs. In the present approach, the overhead data link (ODL) operating at 6.48 Mb/s (megabits per second) is converted to the data communications channel (DCC) rate of 4.096 Mb/s and vice-versa to permit serial data links on the two sides of the circuit to operate at different rates. The implementation may also be easily expanded to rate convert more than eight serial links by width expanding the separate input/output RAM devices.

The present approach more specifically is to convert the clock rate of a serial stream of signals between the ODL clock rate and the DCC clock rate. The circuit of the present conception has a first memory and address select circuit that communicates a stream of serial formatted signals at the ODL clock rate. A second memory and address select circuit communicates the stream of serial formatted signals at the DCC clock rate. The circuit includes clock rate converting components associated between the first memory and address circuit and the second memory and address select circuit to convert the stream of serial formatted signals between the ODL data rate and the DCC data rate while maintaining the stream in the serial format.

To accomplish this, the circuit of the present invention communicates a signal stream in an ODL serial format associated with the ODL rate circuit. The ODL serial format has $101\frac{1}{4}$ bytes inclusive from a beginning byte 1 through an ending byte $101\frac{1}{4}$. The approach also requires communicating the signal stream in a DCC serial format associated with the DCC rate circuit. The DCC serial format has 64 bytes including DCC byte 1 through DCC byte 64. Since for each frame the number of ODL bytes is greater than number of DCC bytes, the approach is to translate between the ODL and DCC frames by associating each of the DCC bytes elements with one of the ODL bytes so that the beginning DCC byte (or DCC byte 1) associates with the ODL frame serially at a position after the beginning ODL byte (i.e., after ODL byte 1) and the ending DCC byte (i.e., DCC byte 64) associates serially before the ending ODL byte (i.e., before ODL byte $101\frac{1}{4}$). In this way, the DCC frame is embedded within or cushioned by the ODL frame.

It is an object of the present invention to provide a rate conversion serial link data circuit that, without transforming the data into parallel, converts serial data from the ODL or high data flowrate to the DCC or low data flowrate and that centers the DCC payload in the ODL frame to provide jitter tolerance.

It is an object of the present invention to provide serial rate conversion in two directions between a high data flowrate circuit and a low data flowrate circuit with fewer circuitry components and requiring less circuit board space than necessary with prior serial rate conversion circuits.

BRIEF DESCRIPTION OF THE DRAWINGS

Other objects and advantages will be apparent from a reading of the specification and appended claims in conjunction with the drawings, wherein:

FIG. 5 provides a conceptual layout of the ODL or high-speed frame format of the preferred embodiment; and FIG. 6 provides the DCC or low-speed frame format according to the preferred embodiment.

DESCRIPTION OF THE PREFERRED EMBODIMENT

Figure 1:
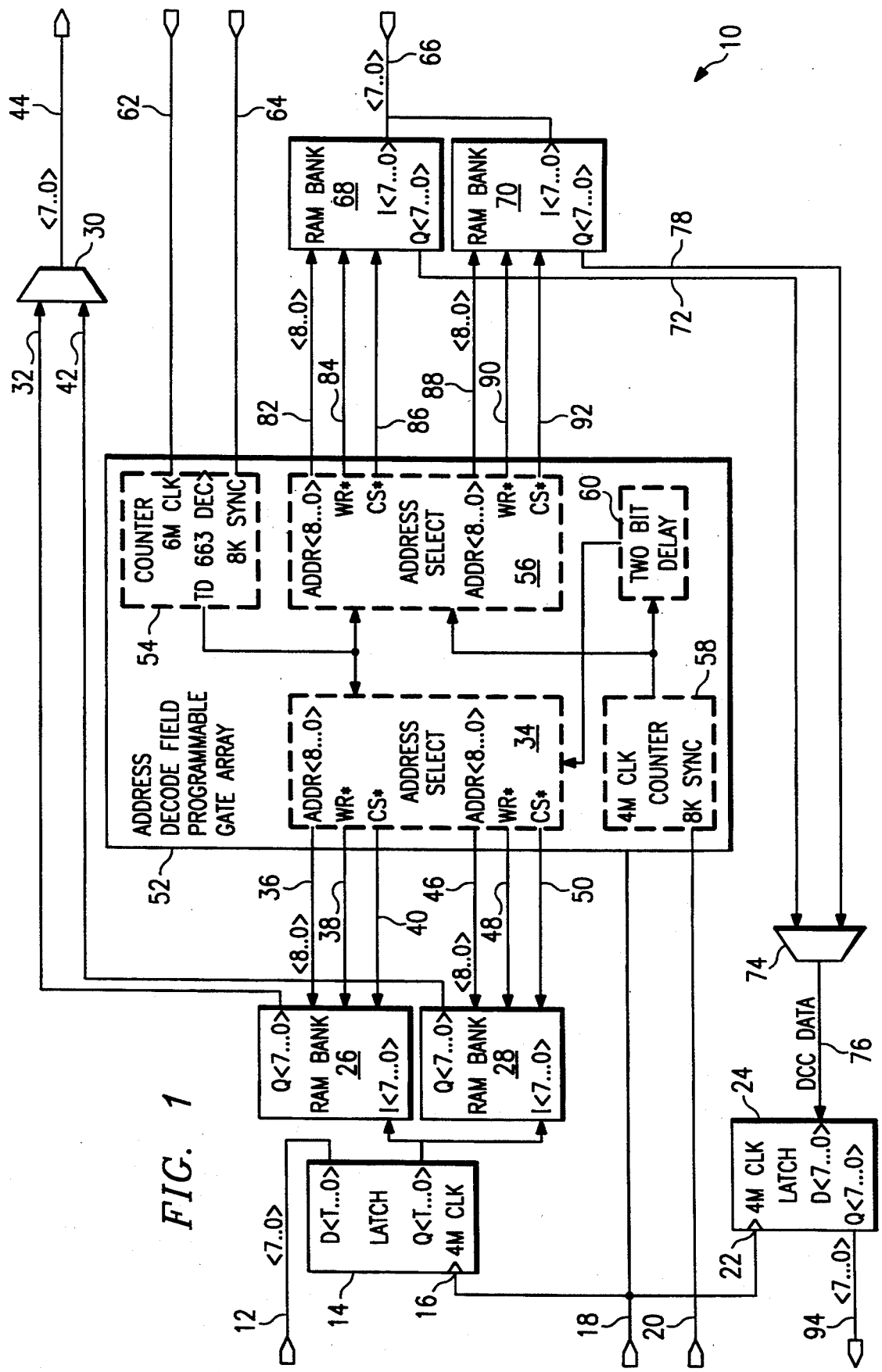
FIG. 1 is a detailed block diagram of the inventive concept.

The present invention converts signals from data communications channels which are embedded in a SONET overhead from a high-speed rate which is a typical SONET overhead data link (ODL) rate of 6.48 Mb/s to the typical data communication channel (DCC) data flowrate of 4.096 Mb/s. The 4.096 Mb/s rate is a rate that is very common to DCC integrated circuits. Using the approach of the preferred embodiment, it is possible to use commercially available data communication integrated circuits and process the data communications overhead bytes within the SONET frames. This makes the inventive approach ideal for providing external access to overhead data links in the SONET network.

The preferred embodiment permits routing data from a central RTSI board to other sub-boards at a normal DCC integrated circuit serial rate. The present invention makes it is possible to fit within a standard European 6U printed circuit board all circuitry necessary to convert the SONET ODL serial rate of 6.48 Mb/s to the normal DCC serial rate of 4.096 Mb/s. By not converting the 6.48-Mb/s ODL data from serial to parallel and then back to serial at the desired DCC 4.096 Mb/s rate, the preferred embodiment directly reads into a RAM location and then reads the data serially at the effective clock rate. The preferred embodiment permits two-way flow of serial signal streams from a rate of 6.48 Mb/s to a rate of 4.096 Mb/s, and vice-versa. The approach is to take from the 6.48 Mb/s side 512 bits within a possible 810 bits and then center the 512 bits as a low-speed payload or take the 512 bits from the 4.096 Mb/s side and center the 512 bits within the high-speed side payload or frame. In this way, the preferred embodiment permits synchronization with an 8-KHz external phase lock loop.

An external phase lock loop locks on the frame boundaries and, in the preferred embodiment, operates at a frequency of 8-KHz to provide a clocking signal every 125 microseconds for adjusting the two rates of the high-speed and low-speed sides. If data loss occurs due to synchronization, it occurs around the frame boundaries. By centering the low-speed payload within the high-speed frame, i.e., not having the low-speed payload at either the beginning or the end of the frame, the chance of losing data due to phase lock loop synchronization adjustment is significantly reduced.

In conventional devices that require a serial-to-parallel conversion, it is also necessary to store the entire 810 bits and then appropriately pull out the desired 512 bits for the low-speed payload. With the preferred embodiment, however, it is possible to store only those bits that make-up the low-speed payload and pull out from the high-speed frame the desired bits for the low-speed payload. The preferred embodiment stores the entire low-speed frame of 512 bits as parts of valid time slots, thus, with the preferred embodiment not only are approximately 300 bits of storage are saved, but also, by not having to convert from serial to parallel and back to serial for the rate conversion, fewer address locations are necessary than in conventional approaches.

In FIG. 1, serial rate conversion circuit 10 of the preferred embodiment appears as a schematic block diagram. Beginning with eight individual data bit links 12 to latch 14, a 4.096-Mb/s clock signal 16 is received from clock input 18 and RTSI RSDDC link 12 comes into serial rate conversion circuit 10. The low data flowrate payload from link 12 is to be centered within the high data flowrate payload. The eight bit lines of link 12 are totally separate and are not related in any way. Although the preferred embodiment uses eight separate bit lines into latch 14, it is possible to size the circuit differently. Therefore, link 12 may include eight bit lines, five bit lines, or whatever would be desired for a particular application. Latch 14 latches the data coming in and associates the data with 4.096-Mb/s clock signal at input 16 to exactly position the data at the boundary of the clock. As such, latch 14 avoids problems with external interfaces not being aligned to a specific 4.096-Mb/s clock boundary.

From latch 14, 4.096 Mb/s serial signals go to RAM bank 26 and RAM bank 28. While signals, for example, are written to RAM bank 26, RAM 28 sends out data in ODL frames for 6.48-Mb/s serial rate data. When RAM bank 26 is filled, the functions of RAM bank 26 and 28 switch so that RAM bank 28 receives the serial signal stream from latch 14, and RAM 26 outputs signals in a 6.48-Mb/s serial frame. Output 32 for RAM bank 26 and output 42 for RAM bank 28, respectively, provide data when RAM bank 26 is being read from or RAM bank 28 is being read from. From lines 32 and 42, 6.48-Mb/s payload data is logically multiplexed through multiplex path 30 to output 44. From output 44, the preferred embodiment sends 6.48-Mb/s ODL signals to a large cross-connect ASIC ("application specific integrated circuit") that acts as the central SONET control circuit. Address connects 36 and 46 go, respectively, to RAM banks 26 and 28. Write enable connects 38 and 48, respectively, control read or write selection for RAM banks 26 and 28. Chip select bits 40 and 50, respectively, control chip selection for RAM banks 26 and 28.

Address decode field programmable gate (FPGA) array 52 provides the decode signals for both RAM banks 26 and 28 on the 4.096-Mb/s side and RAM banks 68 and 70 on the 6.48-Mb/s side. Address decode field programmable gate array 52 includes two internal counters. Counter 54 is a 6.48 Mb/s counter. Counter 58 is a 4.096-Mb/s counter. These counters, respectively, provide information to bank and address select circuits 34 and 56. In relation to the frame for the 4.096-Mb/s side, counter 58 runs one bit faster. Counter 58 receives a 4.096-Mb/s clock signal from clock input 18 and an 8-KHz 4.096-Mb/s sync signal from input 20. Counter 54 receives a 6.48-Mb/s clock signal from input 62 and an 8-KHz synchronous signal from input 64.

On the 6.48-Mb/s side of rate conversion circuit 10, a 6.48-Mb/s input data at input 66 goes to RAM bank 68 and RAM bank 70 in parallel. From RAM bank 68, 4.096-Mb/s data goes along bit lines 72 to DCC data logical multiplexer 74. The 4.096-Mb/s data also comes from RAM bank 70 from bit lines 78. RAM banks 68 and 70 operate in the switching manner similar to that of RAM banks 26 and 28. Address control for RAM bank 68 comes from bank and address select circuit 56 along bit lines 82. Write control signals from bank and address select circuit 56 to RAM bank 68 travel along bit line 84. Chip select control is carried from bank and address select circuit 56 to RAM bank 68 via chip select bit 86. RAM bank 70 receives address control signals along the nine bits 88 from bank and address select circuit 56. Write control signals go to RAM bank 70 via write bit 90, and chip select bit 92 provides control signals from address circuit 56 to RAM bank 70. From DCC data multiplexer 74, 4.096-Mb/s data goes to data latch 24. This data is clocked out through output 94 to the appropriate DCC integrated circuit.

Returning to the 4.096-Mb/s side of conversion circuit 10, in the preferred embodiment, the same nine address bits as represented by bits 36 and 46 connect, respectively, to RAM banks 26 and 28. These same bits are never turned on in exactly the same way at the same time. Only one of the write bits will be enabled at any given moment. The other RAM bank will have the chip select bit enabled only and will cause data to be read out of the RAM bank. Thus, when RAM bank 26 has its write enable bit 38 turned on, latch 14 writes data into RAM bank 26. At that same time, RAM bank 28 will have its chip select bit 50 enabled. This causes data to be read out of RAM bank 28 to logical multiplexer 30 via line 42. The same type of operation applies for writing data into RAM bank 28 and reading data from RAM bank 26.

The address data on the nine bits at 36 and 46 contain incremental count signals that permit writing into the associated RAM bank beginning at location 0 and continuing sequentially through location 511. For example, if location 511 of RAM bank 26 is written to the RAM bank the selection of RAM banks will switch. This causes write enable bit 38 to turn off, write enable bit 48 to turn on, chip select bit 40 to turn on and chip select bit 50 to turn off. This causes 6.48-Mb/s serial signals that RAM bank 26 stores to go along bit 32 to logical multiplexer 30.

Address decode FPGA.52 controls the operation of RAM banks 26 and 28 on the side that converts the 4.096-Mb/s DCC serial data rate to 6.48-Mb/s SONET ODL serial data rate. Address decode FPGA 52 also controls operation of RAM banks 68 and 70 to convert 6.48-Mb/s ODL serial signals to 4.096-Mb/s DCC signals. The preferred embodiment uses a rate conversion circuit consisting of a programmed Actel 1020A FPGA as address decode FPGA 52 and eight separate I/O SRAMs to reorganize the data frames between the ODL and DCC frame formats in both directions (i.e. in a full duplex mode).

Two-bit delay circuit 60 permits lining up the data frames for sending data offboard. It is desirable to have this one bit advance, because this data is latched with the 4.096-Mb/s clock. If the data is one bit early getting it to the external latch, then the data is perfectly aligned after being clocked one more time. When going out upon coming back from the other board, the other board inserts two bits of delay. Therefore, the circuit permits catching the frame two bits later with regard to the 4.096 Mb/s side of circuit 10. With this approach, the preferred embodiment properly aligns the 4.096 Mb/s frame for the 6.48 Mb/s side so that the 6.48 Mb/s side is perfectly aligned with the SONET overhead data link in both the transmit and receive directions.

In order to center the DCC data in the middle of the ODL frame, the 6.48 Mb/s counter 54 is preset to 664 decimal when the 6.48 Mb/s frame sync occurs. The 6.48 Mb/s frame sync occurs 10 bits prior the start of the ODL frame. While data is read from one bank of RAM the outputs of the other bank are set in a high impedance state. The outputs of the two banks are tied together and routed to both the ASICs as ODL inputs.

Figure 2:
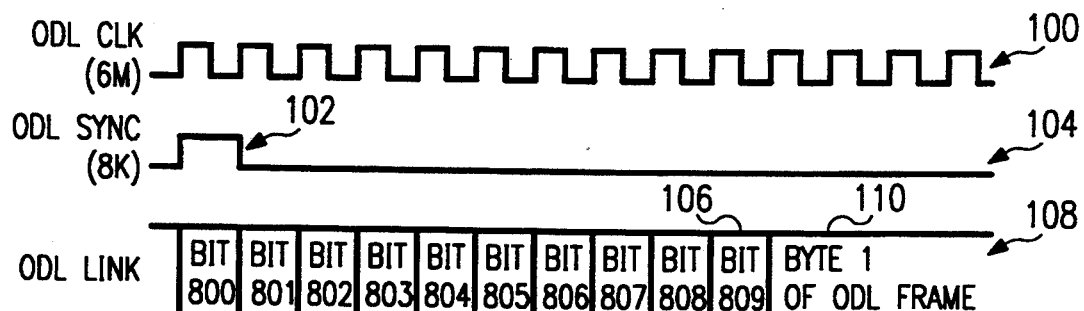
FIG. 2 comprises a ODL timing diagram for the high-speed side of the preferred embodiment.

FIG. 2 shows the timing and formats of the overhead data link that the preferred embodiment uses. In particular, waveform 100 shows the 6.48 Mb/s ODL clock waveform. Waveform 104 illustrates the 8-KHz ODL synchronous or reference clock signal, and format 108 shows the ODL format to illustrate the end of the last bit 809 of an ODL frame at bit 106 and the beginning of byte 0 of ODL frame 108 at 110. In FIG. 2, the ODL sync signal 104 occurs 10 bits before the first byte 110 of ODL frame 108. Placing the ODL frame sync 10 bits before the first frame of the SONET frame is a matter of convention. This permits ASICs that decode on the high-speed side of the circuit to consistently have a place where the ODL sync signals occur. The 8-KHz sync signal identifies where a frame begins and provides an identifier for the location of bit 1 of the ODL frame.

Figure 3:
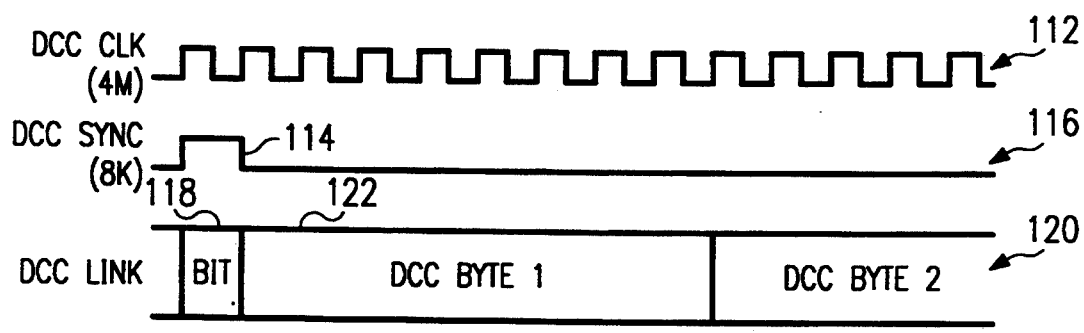
FIG. 3 provides a DCC timing diagram for the low-speed side of the preferred embodiment.

FIG. 3 shows the waveforms for the 4.096 Mb/s DCC clock at waveform 112, the 8-KHz synchronous signal at waveform 116 and the frame format for the DCC data link at frame 120. By convention, the data communications channel sync occurs one-bit before the start of the frame. Specifically, 8-KHz sync signal 114 occurs at bit 118 before DCC byte 1 at 122. Therefore, by DCC sync 114 occurring at bit 118, the beginning of DCC link frame 120 is identified.

Figure 4:
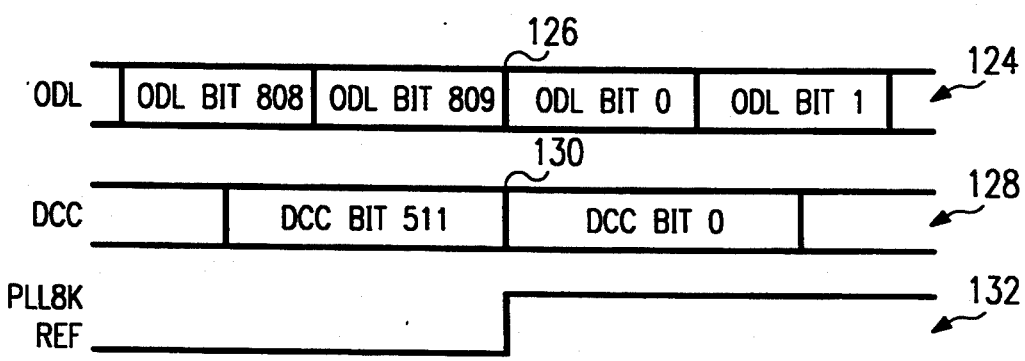
FIG. 4 provides a timing relationship diagram between the ODL and DCC sides of the circuit of the preferred embodiment.

FIG. 4 shows the DCC/ODL link interface timing relationship for the serial rate conversion circuit 10 of the preferred embodiment, FIG. 4 shows the timing of the ODL and DCC links. The rising edge of the phase lock loop 8-KHz reference signal which occurs every 125 microseconds marks the beginning of both the ODL and DCC frames. The bits in an ODL frame are numbered 0–809, and the bits in a DCC frame are numbered 0–511. In particular, the ODL frame appears as frame 124, the DCC frame appears as frame 128, and the phase lock loop 8-KHz reference signal appears as waveform 132 in FIG. 4. ODL frame 124 shows ODL bits 808, 809, 0 and 1 and identifies the beginning of the ODL frame at point 126. Frame 128 shows the DCC frame beginning between DCC bit 511 and DCC bit 0 at point 130. When the phase lock loop 8-KHz reference signal waveform 132 turns on, both the ODL frame 124 and DCC frame 128 begin. At this point, ODL frame 124 is aligned with DCC frame 128. From the 8-KHz reference signal the actual DCC sync signal is provided via circuitry as is the ODL sync signal. But all signals are based on the phase lock loop 8-KHz external reference signal.

FIG. 5 provides a conceptual illustration of the ODL frame format. The ODL frame consist of 101¼ bytes. There are 99 valid bytes and 2¼ unused bytes at the end of the frame or 810 bits of information. The preferred embodiment positions the DCC payload within the ODL frame. The DCC payload consists of 64 valid bytes or 512 bits the remaining bytes being non-data or non-valid. FIG. 6 shows how the preferred embodiment embeds the DCC 64 bytes within the 101¼ bytes of the ODL format. By placing the first DCC bytes at 17 bytes into the ODL frame, there are unused bits both before and after the DCC frame. By selecting ODL bytes 18–82, for example, of the ODL frame to be valid and to contain the 64 DCC bytes the preferred embodiment buffers around the DCC frame. Thus, if any corrections or alignments that occur in the rate conversion process are due to the phase lock loop reference signal as indicated by waveform 132 of FIG. 4, the data will not be lost from the DCC frame. When converting from ODL to DCC format only the valid ODL bytes are converted to a DCC format.

An important technical advantage of the present invention is that it achieves serial rate conversion with between a 20 and 40% lower component count and associated board space than that of conventional serial rate conversion circuits. Therefore, for converting between the 6.48 Mb/s ODL data rate to the 4.096 Mb/s DCC data rate, it is possible to use standard 6U European boards that accommodate the numerous desired SONET applications.

One difference between the present inventive approach and that of conventional circuits is that the preferred embodiment does not perform parity checks on a bit basis within individual lengths during the conversion process. This is not a significant limitation, because serial-to-parallel conversion does not take place in the circuit of the preferred embodiment. In a conventional circuit a parallel conversion is made, it is easy to use a ninth bit to parity check the consistency of other bits within the frame. Since integrity of the data is checked normally at both ends with a cyclic redundancy check (CRC) or other error checking methods, if an error is not detected during the rate conversion process, it is caught on one end of the other two boards in an associated subsystem. As such, because the preferred embodiment does not perform a parity check on a bit basis, this does not significantly impact operation of serial rate conversion circuit 10.

OPERATION

The operation of the present concept is believed reasonably straight forward once the concept is understood. For receiving 4.096 Mb/s DCC serial data and converting it to 6.48 Mb/s ODL serial data, the preferred embodiment receives at the eight input bits 12 the 4.096 Mb/s data and sends the bits to latch 14 along with a 4.096 Mb/s clock signal at clock signal input 16 of FIG. 1. According to the 4.096 Mb/s clock signal, data is read into RAMs bank 26 or 28, depending on the control provided by the associated address decode FPGA 52 through write enable bits 38 and 48 and chip select bits 40 and 50.

Assuming that data first is written into RAM bank 26 at location 0 by virtue of write enable bit 38 being turned on, address bits 36 control the location of RAM bank 26 into which the DCC data is read. Once location 511 is filled in RAM bank 26, the 8-KHz external phase lock loop reference signal will cause the write enable bit 38 to turn off and chip select bit 40 to turn on. At the same time, write enable bit 48 will turn on and chip select bit 50 will turn off. This will cause latch 14 to write DCC 4.096 Mb/s data into RAM bank 28. With chip select enable bit 40 turned on, RAM bank 26 will send 6.48 Mb/s data out from link 32 to logical multiplexer 30. From logical multiplexer 30, 6.48 MB/s ODL frame data will go from rate conversion circuit 10 along 8-bit 6.48 Mb/s output 44.

To convert 6.48 Mb/s ODL data to 4.096 Mb/s DCC data, the serial rate conversion circuit 10 of the preferred embodiment operates by receiving the ODL data at input 66. Directly from input 66, data will go either to RAM bank 68 or 70. Assuming that data first goes to RAM bank 68, nine address bits 82 will control the location into which data is read into RAM bank 68. Write enable bit 84 then turns on and chip select bit 86 turns off. Conversely, address bits 88 switch address source, write enable bit 90 turns off and chip select bit 92 turns on. Any data that is in RAM bank 70 will be sent via bit 78 to logical multiplexer 74 to be output as DCC data to latch 24. Latch 24 receives a 4.096 Mb/s clock signal at clock input 22 and outputs DCC data via bits 80 to external circuitry. Once RAM bank 68 is filled, phase lock loop 8-KHz reference signal causes write enable bit 84 to turn off, chip select bit 86 to turn on and data to be output via output bits 72 to logical multiplexer 74. From logical multiplexer 74, data goes to latch 24 to be output at 4.096 Mb/s output bits 94.

While I have described the concept with respect to the data communication channel and the SONET overhead data link it is to be realized that this concept can apply to any serial rate conversion circuit. The basic concept of the ODL/DCC data conversion circuit can be applied to any two serial data links which operate at different rates. I, therefore, wish to be limited not by the specific invention embodiment illustrated and described above, but only by the scope of the inventive concept of converting from a first serial rate for a serial stream of signals to a second serial rate for a serial stream of signals by using a first memory and address select circuit for communicating a stream of serial formatted signals having an associated first clock rate and a second memory and address select circuit for communicating said stream of serial formatted signals at a second clock rate and a clock rate conversion circuit associated between the first memory and address circuit and the second memory and address select circuit for converting the stream of serial formatted signals between the first clock rate and the second clock rate while maintaining the stream of signals in a serial format and providing jitter tolerance during the conversion process.

What is claimed is:

1. A method for communicating signals between a high clock rate circuit and a low clock rate circuit and providing jitter tolerance, the method comprising the steps of:

communicating a serial signal stream in a high data flow rate serial format associated with a high clock rate circuit, the high data flow rate serial format having a first predetermined number of high data flow rate format elements including a first high data flow rate format element and a last high data flow rate format element, and wherein the high data flow rate format elements comprise data elements and non-data elements;

communicating the signal stream in a low data flow rate serial format associated with a low clock rate circuit, the low data flow rate serial format having a predetermined number of low data flow rate format elements, including a first low data flow rate format element and a last low data flow rate format element, the predetermined number of high data flow rate format elements being greater than the predetermined number of low data flow rate format elements;

continuously translating the serial stream between the low data flow rate serial format and the high data flow rate serial format by associating each of the low data flow rate format elements with one of the high data flow rate format data elements so that the first low data flow rate format element associates with said high data flow rate serial format data element at a position that is serially after the first high data flow rate format element and for the last low data flow rate format element to associate with a high data flow rate format data element at a position that is serially before the last high data flow rate format element; and continuously translating the serial stream between the high data flow rate serial format and the low data flow rate serial format by associating each of the high data flow rate data elements with one of the low data flow rate elements.

2. A method for communicating signals between an ODL circuit and a DCC circuit with tolerance for jitter, the method comprising the steps of:

communicating an ODL frame of data in a serial stream associated with an ODL data flow rate circuit, the ODL frame having at least 99 valid bytes including an ODL byte 0 through an ODL byte 98 and wherein;

communicating the signal stream in a DCC frame associated with a DCC data flow rate circuit, the DCC format having 64 bytes including a DCC byte 0 through a DCC byte 63;

continuously translating the signal stream between the DCC frame and the ODL frame by associating each of the DCC bytes with one of the ODL bytes so that the DCC byte 0 associates with an ODL frame at a position that is serially after the ODL byte 0 and so that the DCC byte 64 associates with an ODL frame at a position that is serially before the ODL byte 98; and continuously translating the signal stream between the ODL frame and the DCC frame by associating each of the ODL bytes with one of the DCC bytes.

3. A serial rate conversion circuit for communicating signals between a high clock rate circuit and a low clock rate circuit, the circuit comprising:

a high clock rate memory and address select circuit for storing and communicating a serial stream in a high clock rate serial format associated with the high clock rate circuit, the high clock rate serial format having a first predetermined number of high clock rate format elements, including a first high clock rate format element and a last high clock rate format element;

a low clock rate memory and address select circuit for storing and communicating a signal stream in a low clock rate serial format associated with the low clock rate circuit, the low clock rate serial format having a second predetermined number of low clock rate serial format elements, including a first low clock rate format element and a last low clock rate format element, and wherein the first predetermined number of high clock rate format elements is greater in number than the second predetermined number of low clock rate format elements; and translating means for continuously translating the low clock rate serial format elements to the high clock rate format elements by associating each of the low clock rate elements with one of the high clock rate format elements for the first low clock rate format element to associate with the high clock rate serial format at a position that is serially after the first high clock rate format element and for the last low clock rate format element to associate at a position that is serially before the last high clock rate format element, and wherein said translating means is further operable to continuously translate the high clock rate format elements to low clock rate format elements by associating each of the high clock rate format elements with one of the low clock rate format elements.

* * * * *